US010983485B2

(12) United States Patent
Hentschel et al.

(10) Patent No.: US 10,983,485 B2
(45) Date of Patent: Apr. 20, 2021

(54) METHOD AND CONTROL DEVICE FOR CONTROLLING A TECHNICAL SYSTEM

(71) Applicant: Siemens Aktiengesellschaft, Munich (DE)

(72) Inventors: Alexander Hentschel, Vancouver (CA); Markus Michael Geipel, Munich (DE)

(73) Assignee: SIEMENS AKTIENGESELLSCHAFT (*) Notice: Subject to any disclaimer, the term of this patent is extended or adjusted under 35 U.S.C. 154(b) by 0 days.

(21) Appl. No.: 16/500,439

(22) PCT Filed: Feb. 6, 2018

(86) PCT No.: PCT/EP2018/052918
§ 371 (c)(1),
(2) Date: Oct. 3, 2019

(87) PCT Pub. No.: WO2018/184754
PCT Pub. Date: Oct. 11, 2018

(65) Prior Publication Data
US 2020/0192304 A1 Jun. 18, 2020

(30) Foreign Application Priority Data
Apr. 4, 2017 (DE) ...................... 10 2017 205 713.0

(51) Int. Cl.
G05B 13/02 (2006.01)
G06N 3/04 (2006.01)
(52) U.S. Cl.
CPC ............ G05B 13/027 (2013.01); G06N 3/04 (2013.01)
(58) Field of Classification Search
CPC .................................. G05B 13/027; G06N 3/04
See application file for complete search history.

(56) References Cited

U.S. PATENT DOCUMENTS 5,704,011 A 12/1997 Hansen et al.
6,556,980 B1 4/2003 Cheng
(Continued)

FOREIGN PATENT DOCUMENTS

CN 1316070 A 10/2001
CN 1382997 A 12/2002
(Continued)

OTHER PUBLICATIONS

Alarcon-Aquino et al., "Multiresolution FIR Neural-Network-Based Learning Algorithm Applied to Network Traffic Prediction", Mar. 2006, IEEE Transactions on Systems, Man, and Cybernetics—Part C: Applications and Reviews, vol. 36, No. 2, pp. 208-220 (Year: 2006).*

(Continued)

Primary Examiner — Kamran Afshar
Assistant Examiner — Brent Johnston Hoover
(74) Attorney, Agent, or Firm — Schmeiser, Olsen & Watts LLP

(57) ABSTRACT

In order to control a technical system, e.g. of a wind turbine, a temporal sequence of operating parameter values of the technical system that is continuously recorded and continuously converted into a sequence of filtered signal values by a trainable digital filter. The sequence of the filtered signal values is supplied to a mechanical learning routine which derives prediction values therefrom for a target operating parameter. The digital filter and the mechanical learning routine are trained to reduce a distance between derived prediction values and temporally corresponding, actually recorded values of the target operation parameter. The prediction values for controlling the technical system are then emitted.

12 Claims, 2 Drawing Sheets

(56) References Cited

U.S. PATENT DOCUMENTS

Figure 1:
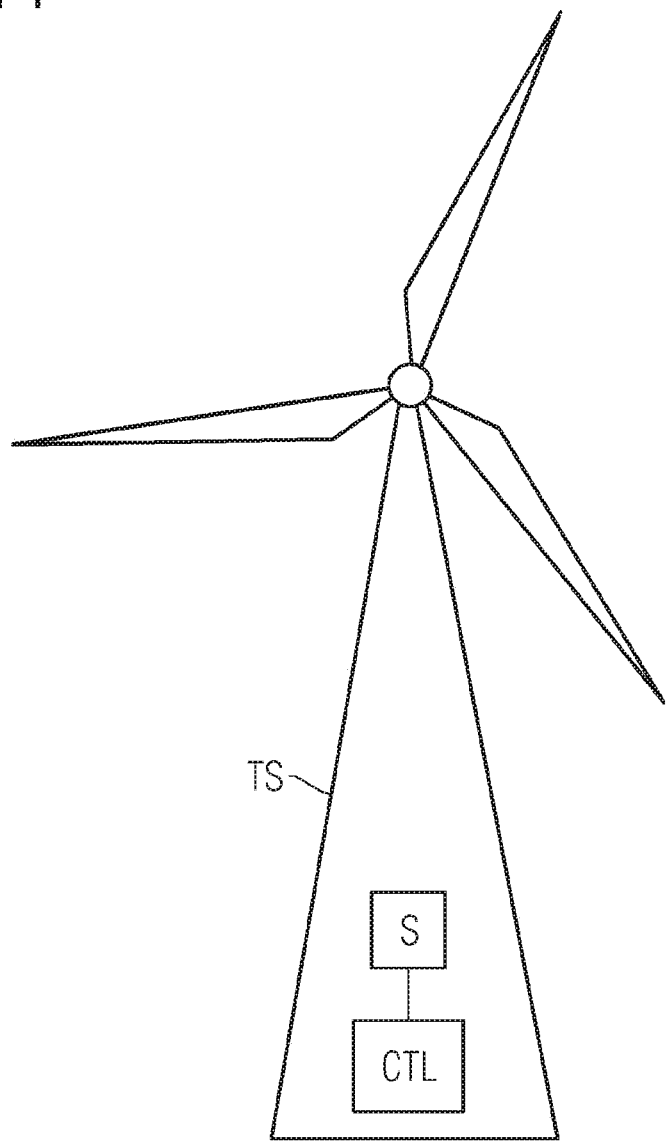

| | | | |
|---|---|---|---|
| 2007/0022068 A1* | 1/2007 | Linsker | G05B 13/026 706/23 |
| 2009/0271344 A1 | 10/2009 | Schafer et al. | |
| 2011/0153144 A1 | 6/2011 | Dlugoss et al. | |
| 2013/0024179 A1 | 1/2013 | Mazzaro et al. | |
| 2014/0180975 A1 | 6/2014 | Martinez et al. | |
| 2015/0306761 A1* | 10/2015 | O'Connor | G05D 1/0221 700/250 |
| 2016/0019455 A1 | 1/2016 | Annapureddy | |
| 2016/0147201 A1 | 5/2016 | Crncich-DeWolf et al. | |
| 2017/0160706 A1 | 6/2017 | Dull et al. | |

FOREIGN PATENT DOCUMENTS

| | | |
|---|---|---|
| CN | 101295969 A | 10/2008 |
| CN | 102889992 A | 1/2013 |
| CN | 103066601 A | 4/2013 |
| CN | 104085265 A | 10/2014 |
| CN | 104706349 A | 6/2015 |
| CN | 104956359 A | 9/2015 |
| CN | 105279495 A | 1/2016 |
| CN | 105867116 A | 8/2016 |
| CN | 105976051 A | 9/2016 |
| CN | 106059532 A | 10/2016 |
| CN | 106327021 A | 1/2017 |
| CN | 106485324 A | 3/2017 |
| CN | 106535076 A | 3/2017 |
| DE | 4429517 A1 | 2/1996 |
| DE | 102008020379 A1 | 10/2009 |
| DE | 102010054425 A1 | 8/2011 |
| EP | 0712060 A1 | 5/1996 |
| JP | H06186064 A | 7/1994 |
| KR | 20170024086 A | 3/2017 |
| KR | 20170031695 A | 3/2017 |

OTHER PUBLICATIONS

Widrow et al., "Neural nets for adaptive filtering and adaptive pattern recognition", Mar. 1988, Computer, vol. 21, Issue: 3, pp. 25-39 (Year: 1988).*

Tufte et al., "Evolving an adaptive digital filter", Aug. 6, 2002, Proceedings. The Second NASA/DoD Workshop on Evolvable Hardware, pp. 1-8 (Year: 2002).*

PCT International Search Report and Written Opinion of International Searching Authority dated Apr. 5, 2018 corresponding to PCT International Application No. PCT/EP2018/052918 filed Jun. 2, 2018.

Non-English German Search Report for Application No. 10 2017 205 713.0, dated Nov. 16, 2017.

Dai Jun et al:"Ripple-free Optimization Design for Digital Filter Based on Neutral Networks", Journal of Sichuan University of Science Engineering, Apr. 30, 2013.; English Abstract.

Zhang, Jingzhou et al:, "Filtering of ECG Signals Based on Adaptive Linear Neural Network", Journal of Shaanxi University of Science and Technology; 2005; English Abstract.

Non-English Chinese Office Action for Application No. 201880037188.3, dated May 21, 2020.

Hong, Zhi-Quan et al, "Adaptive Neural Network Digital Filters Technology", Computng Techniques for Geophysical and Geochemical Exploration; 2000; English Abstract.

Zhang Xiao et al:, "Digital Filter Based on Neural Network, Acta Scientiarum Naturalium", Universitatis Nankaiensis; 2001; English Abstract.

Li, Si et al:, "Optimal design of high order multi-band-pass FIR digital filter", Electric Power Automation Equipment; 2007; English Abstract.

Non-English Korean Office Action for Application No. 10 2019 7032404, dated Jan. 21, 2020.

* cited by examiner

METHOD AND CONTROL DEVICE FOR CONTROLLING A TECHNICAL SYSTEM

CROSS-REFERENCE TO RELATED APPLICATIONS

This application claims priority to PCT Application No. PCT/EP2018/052918, having a filing date of Feb. 6, 2018, which is based off of DE Application No. 10 2017 205 713.0, having a filing date of Apr. 4, 2017, the entire contents both of which are hereby incorporated by reference.

FIELD OF TECHNOLOGY

The following relates to a method and control device for controlling a technical system.

BACKGROUND

When controlling complex technical systems, such as for example wind turbines, gas turbines, production installations, motor vehicles or power grids, it is generally desirable to forecast, that is to say predict, a behavior, an effect and/or a yield of the technical system, at least in the short term, in order to optimize the control of the technical system with regard to specified criteria.

Thus, for example, a turbine may be monitored by operating parameters that are measured on the turbine being compared with values that are forecast for an operational turbine under the same working conditions. If there is a deviation, suitable countermeasures can then be taken in good time. Furthermore, effects of different control measures can be predicted, to then actually apply the control measure that optimizes a system behavior.

For the prediction of operating parameters, modern controls often use control models that are based on machine learning technologies. For a sufficiently accurate prediction of a system behavior, however, it is often exemplary for longer time series of a multiplicity of operating parameters to be evaluated in real time. In the case of complex technical systems, it is thus quite easily possible that several thousand individual operating parameter values have to be taken into consideration for a prediction.

For the efficient evaluation of such time series data, they are often subjected to a pre-processing, in order to extract specifically data patterns that are relevant for the prediction and in this way reduce the amount of data. Such a pre-processing however generally has to be specifically designed by an expert and involves a correspondingly great amount of effort in terms of time.

Time series that are not pre-processed are often evaluated by means of recurrent neural networks. With recurrent neural networks, however, any success of training is generally reduced when there are longer time series.

SUMMARY

An aspect relates to provide a method and a control device for controlling a technical system that allow a more efficient prediction.

For controlling a technical system, for example a gas turbine, a production installation, a generator, a compressor, a motor vehicle, a power grid, a solar installation or some other installation, a temporal sequence of operating parameter values of the technical system is continuously recorded and continuously converted into a sequence of filtered signal values by a trainable digital filter. The sequence of filtered signal values is fed to a machine learning routine, which derives from it prediction values for a target operating parameter. The digital filter and also the machine learning routine are trained to reduce a disparity between derived prediction values and temporally corresponding actually recorded values of the target operating parameter. Furthermore, the prediction values for controlling the technical system are output.

For executing the method according to embodiments of the invention, a control device, a computer program product comprising a computer readable hardware storage device having computer readable program code stored therein (non-transitory computer readable storage medium having instructions, which when executed by a processor, perform actions), and also a computer-readable storage medium are provided.

The method according to embodiments of the invention and also the control device according to embodiments of the invention may for example be executed or implemented by means of one or more processors, application-specific integrated circuits (ASIC), digital signal processors (DSP) and/ or so-called "Field Programmable Gate Arrays" (FPGA).

One advantage of embodiments of the invention can be seen as that of being able to use the training for training the digital filter on the one hand and the machine learning routine on the other hand with respect to one another. Thus, on the one hand the digital filter can be trained to extract specific operating parameter features that are relevant for a good prediction of the target operating parameter while on the other hand the machine learning routine can be trained to forecast the target operating parameter on the basis of the extracted operating parameter features with the smallest possible prediction error. This generally allows more efficient training and a more accurate and more efficient prediction. In particular, internal system interactions that are a priori still unknown can also often be detected and evaluated in an automated manner. In addition, a training efficiency can be scaled up better to longer sequences of operating parameter values than for example in the case of a recurrent neural network.

On the basis of the prediction values, the technical system can be controlled in a forward-looking way. In this case, a system behavior can be optimized and unfavorable system behavior can often be countered in good time. The prediction values can be used in particular for monitoring the technical system, for detecting damage, for detecting wear, for matching a need for resources to an offer of resources and/or for other forward-looking control or planning measures.

The machine learning routine and/or the digital filter may comprise an artificial neural network, a recurrent neural network, a convolutional neural network, an autoencoder, a deep learning architecture, a support vector machine, a data-driven trainable regression model, a k-nearest-neighbor classifier, a physical model and/or a decision tree. In particular, the machine learning routine may comprise MLP layers (MLP: Multi-Layer Perceptron).

Advantageously, the digital filter and the machine learning routine may be trained together, in parallel. In this way, a specific extraction of prediction-relevant operating parameter features by the digital filter and a modeling of the target operating parameter by the machine learning routine can be optimized with respect to one another.

Furthermore, the conversion by the digital filter may be based on filter parameters that are modified by the training of the digital filter in such a way that the disparity is reduced.

The filter parameters can consequently be understood as a training structure of the digital filter.

According to an advantageous embodiment of the invention, in the conversion of the sequence of operating parameter values, moving totals of the operating parameter values that are weighted by filter parameters may be formed over a time window. The filter parameters can consequently be understood as filter weights. The time window and/or its length may be specified and/or modified in the course of the training.

In particular, the weighted totals may be formed by a convolution of the sequence of operating parameter values with a sequence of filter parameters and/or by a moving scalar product of a sequence of operating parameter values with the sequence of filter parameters. The filter parameters may consequently be understood as a filter kernel.

According to a particularly advantageous embodiment of the invention, the digital filter may comprise one or more convolutional neural layers and/or a pooling layer for filtering the sequence of operating parameter values. In particular, a number of convolutional neural layers may be arranged one after the other. A number of pooling layers may be arranged between the convolutional neural layers. Convolutional neural layers are often also referred to as "convolutional layers", a neural network implemented with them as a "convolutional neural network". The training efficiency of convolutional neural layers scales up particularly well to longer sequences of operating parameter values.

According to a further embodiment of the invention, a statistical average value of individual disparities respectively between a prediction value and a temporally corresponding actually recorded value of the target operating parameter may be used as the disparity. In this way, stochastic influences on the target operating parameter can generally be processed better.

In addition, for recording the sequence of operating parameter values, it is possible that sequences of values of a number of operating parameters are recorded, the sequences of values are respectively interpolated to a common, specified time frame and the sequences of values interpolated to the time frame are combined to form the sequence of operating parameter values. Such an interpolation is often also referred to as resampling. The interpolation to a common time frame can have the effect in particular that the further processing of the operating parameter values is unified and simplified.

BRIEF DESCRIPTION

Figure 2:
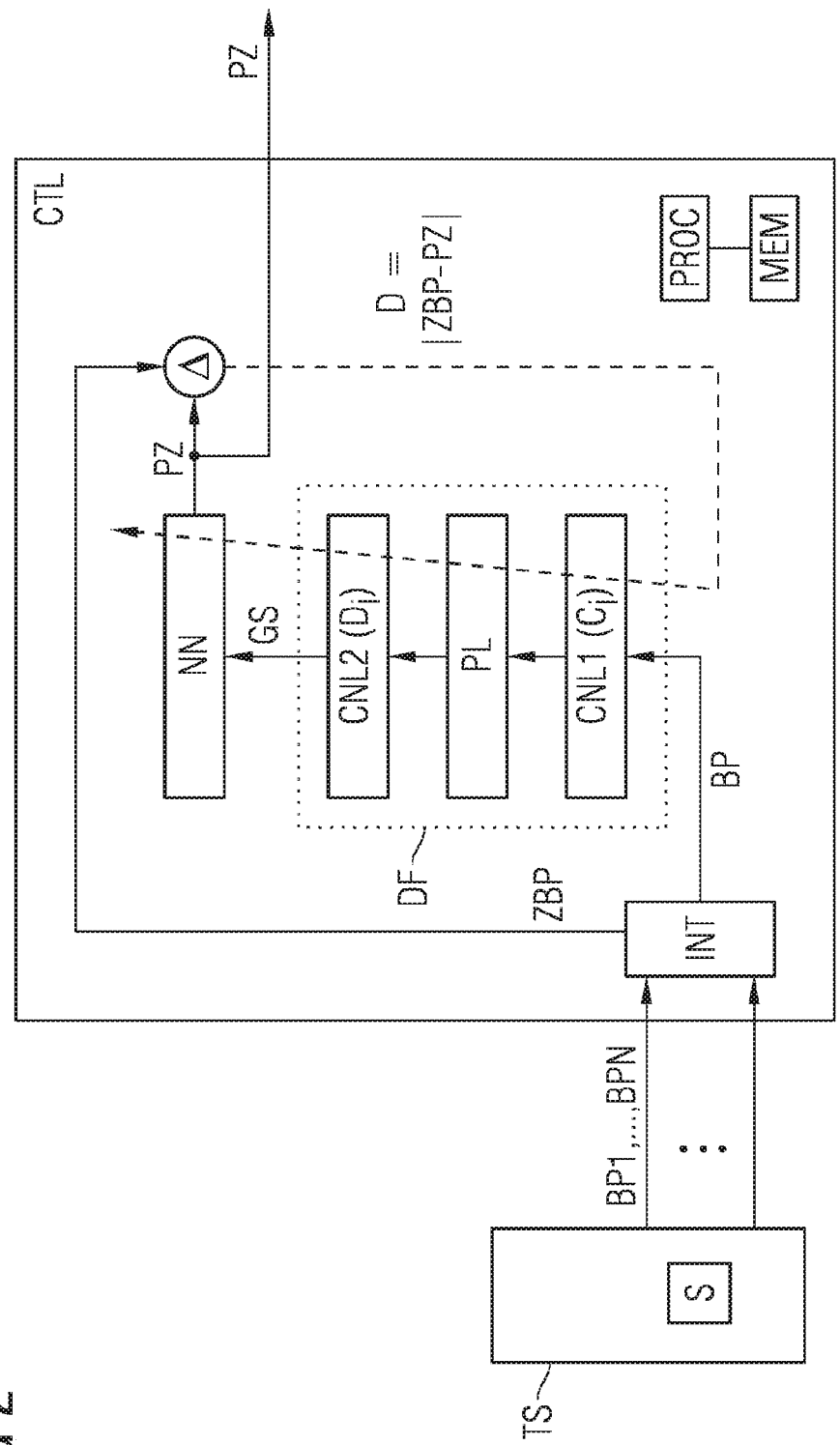

Some of the embodiments will be described in detail, with reference to the following figures, wherein like designations denote like members, wherein:

FIG. 1 shows a wind turbine with a control device according to the invention; and FIG. 2 shows a control device according to the invention in a more detailed representation.

DETAILED DESCRIPTION

FIG. 1 shows a wind turbine by way of example as the technical system TS in a schematic representation. Alternatively or in addition, a gas turbine, a production installation, a generator, a compressor, a motor vehicle, a power grid, a solar installation or some other installation or a combination thereof may also be provided as the technical system TS.

The wind turbine TS has a control device CTL according to embodiments of the invention, which may be implemented as part of the technical system TS or entirely or partially externally in relation to the technical system TS. The control device CTL serves for controlling the technical system TS. Controlling the technical system TS should be understood here as also meaning outputting and using data and control signals that are control-relevant, that is to say contribute to controlling the technical system TS. Such control-relevant data may comprise in particular forecast data, analysis data, monitoring data and/or classification data, which may be used in particular for monitoring the technical system TS and/or for detecting wear and/or damage.

The technical system TS also has sensors S that are coupled to the control device CTL, continuously measure a multiplicity of operating parameters of the technical system TS and transmit them to the control device CTL. A respective sensor S may also be implemented here as a soft sensor.

Apart from the sensor data, further operating parameters of the technical system TS are also recorded by the control device CTL. Here and hereinafter, operating parameters that may be recorded are in particular physical, technical-control, technical-effect and/or type-dependent operating parameters, properties, performance data, effect data, state data, system data, default values, control data, sensor data, measured values, ambient data, monitoring data, forecast data, analysis data, and/or other data occurring in the operation of the technical system TS and/or describing an operating state of the technical system TS. For example, data concerning temperature, pressure, emissions, vibrations, vibrational states, consumption of resources, etc. Specifically, in the case of a wind turbine, the operating parameters may be a wind speed, a wind direction, a turbine output, a rotational speed and/or an acceleration of the engine nacelle.

FIG. 2 shows a control device CTL according to embodiments of the invention for controlling a technical system TS in a more detailed representation. The control device CTL has one or more processors PROC for executing all of the method steps of the control device CTL and also one or more memories MEM, coupled to the processor PROC, for storing the data to be processed by the control device CTL.

The control device CTL is coupled to the technical system TS and records from it sequences of values BP1, . . . , BPN of a multiplicity of operating parameters of the technical system TS. The sequences of values BP1, . . . , BPN are measured by a multiplicity of sensors S of the technical system TS or are otherwise provided by the technical system TS or other devices.

The sequences of values BP1, . . . , BPN are fed to an interpolation device INT of the control device CTL. The interpolation device INT interpolates the sequences of values BP1, . . . , BPN respectively to a common, specified time frame and at the same time possibly executes an operating-parameter-individual normalization of the numerical values and/or a unit conversion. Such an interpolation is often also referred to as resampling. The sequences of values interpolated to the time frame are combined by the interpolation device INT into a temporal sequence, that is to say into a time series of operating parameter values BP on the common time frame.

The time series of the operating parameter values BP is continuously recorded and processed. The points in time of the time frame may be in increments of for example about one second. In practice, for example, a behavior of a wind turbine is substantially determined by an operating parameter profile in a time window of the order of magnitude of several minutes, typically about 2 minutes. This means that, in the case of a prediction, one or several hundred time series points have to be evaluated respectively for the multiplicity of operating parameters recorded.

One or more target operating parameters ZBP are also recorded in particular as operating parameters. According to embodiments of the invention, the control device CTL is intended to be trained to predict the target operating parameter or parameters ZBP, in order to control the technical system TS in a forward-looking manner. A respective target operating parameter ZBP may concern here for example a temperature, an output, a yield, an amount of wear, emissions, vibrations or some other behavior of the technical system TS.

The temporal sequence of operating parameter values BP is fed by the interpolation device INT to a digital filter DF and filtered by the latter. The digital filter DF comprises a number of convolutional neural layers CNL1 and CNL2 and also a pooling layer PL arranged in between. The convolutional neural layers CNL1 and CNL2 may be respectively understood as FIR filters (FIR: Finite Impulse Response), with the filter parameters $C_i$ or $D_i$ of which a total moving over a time window is respectively weighted. By the convolutional neural layers CNL1 and CNL2, the weighted totals are respectively formed by a convolution of a respective time-discrete input signal of the convolutional neural layer CNL1 or CNL2 with the filter parameters $C_i$ or $D_i$. If an input signal fed to the convolutional neural layer CNL1 or CNL2 is denoted by $X_i$ or $Y_i$, the respective convolution may be represented as $F_n = \Sigma_i C_i \cdot X_{n-1}$ or $G_n = \Sigma_i D_i \cdot Y_{n-1}$, the index i of the total running through the finite number of respective filter parameters. The convolutions $F_n$ and $G_n$ are continuously calculated with a continuous index n and output by the respectively convolutional neural layer CNL1 or CNL2. Such filter parameters $C_i$ and $D_i$ are often also referred to as convolution weights or the filter kernel.

In the present exemplary embodiment, the pooling layer PL is arranged between the convolutional neural layers CNL1 and CNL2. The pooling layer PL serves for aggregating data supplied, for reducing data and/or for reducing redundancy. The pooling layer PL is intended to extract from the output data $F_n$ of the convolutional neural layer CNL1 specifically those data in relation to which the convolutional neural layer CNL1 to a certain extent shows a particularly strong reaction.

For filtering the sequence of operating parameter values BP, they are fed to the input layer CNL1 of the digital filter DF, which convolutes the sequence of operating parameter values BP, that is to say according to the above notation the sequence of $X_i$ with the filter parameters $C_i$. The convoluted operating parameters $F_n$ are fed through the convolutional neural layer CNL1 to the pooling layer PL, are aggregated and reduced by the pooling layer PL and the result of the reduction, here $Y_i$, is fed to the convolutional neural layer CNL2. The result of the reduction $Y_i$ is convoluted by the convolutional neural layer CNL2 with the filter parameters $D_i$. As a result of this second convolution, a time-discrete sequence of filtered signal values GS is output by the convolutional neural layer CNL2.

According to embodiments of the invention, it is endeavored that the sequence of filtered signal values GS contains or indicates as specifically as possible those features, patterns or correlations of the sequence of operating parameter values BP that are relevant for a good prediction of the target operating parameter BP. In the technical field of machine learning, such features, patterns or correlations are referred to as features, and their determination is referred to as feature extraction.

The sequence of layers described above of the digital filter implements a convolutional neural network, which converts the time series of the operating parameter values BP continuously into the sequence of filtered signal values GS. Within a deep learning architecture, it is also possible for a greater number of convolutional neural layers to be arranged one after the other.

The sequence of filtered signal values GS is fed through the digital filter DF to a data-driven machine learning routine, which in the present exemplary embodiment is implemented by a neural network NN. The neural network NN may for example comprise a number of MLP layers (MLP: Multi Layer Perceptron). The neural network may in particular have a deep learning architecture.

The neural network NN is capable of being trained or capable of learning in a data-driven manner and has a training structure that forms during training.

Training should be understood as meaning generally an optimization of a mapping of input parameters of a parameterized system model, for example a neural network, onto one or more target parameters. This mapping is optimized on the basis of specified criteria that have been learned and/or are to be learned during a training phase. In the case of prediction models, a prediction error, a classification error, an analysis error and/or a simulation error or, complementary thereto, a prediction quality, a classification quality, an analysis quality and/or a simulation quality may be used in particular as criteria. In addition, a performance, a consumption of resources, a yield and/or an amount of wear of the technical system TS may be provided as criteria. A training structure may for example comprise an interconnected structure of neurons of a neural network and/or weights of connections between the neurons that are formed by the training in such a way that the specified criteria are satisfied as well as possible.

According to embodiments of the invention, it is endeavored that the neural network NN determines from the sequence of filtered signal values GS a prediction value PZ that is as good as possible for the target operating parameter ZBP. For this purpose, the values output by the neural network NN as prediction value PZ are compared with temporally corresponding, actually recorded values of the target operating parameter ZBP, which are provided by the interpolation device INT. Here, a respective prediction value PZ referred to a point in time can be buffer-stored as long as it takes until the respective value of the target operating parameter ZBP referred to the same point in time is actually recorded and available.

Within the comparison, a disparity D between the predicted values PZ of the target operating parameters ZBP and the temporally corresponding, actually recorded value of the target operating parameter ZBP is formed. The disparity D represents a prediction error of the combination of the digital filter DF and the neural network NN.

Formed as the disparity D is a statistical average value of individual disparities, respectively between a prediction value PZ and a temporally corresponding, actually recorded value of the target operating parameter ZBP, over a specified time window, for example as a moving average. In this way, stochastic, that is to say non-deterministic, influences on the prediction value can be processed better.

The disparity D is returned both to the digital filter DF and to the neural network NN. On the basis of the returned disparity D, the digital filter DF, that is to say the convolutional neural layers CNL1 and CNL2 and the pooling layer PL, and also the neural network NN—as indicated by a dashed arrow—are together trained to minimize the disparity D, that is to say predict the target operating parameter ZBP as well as possible by the prediction value PZ as a statistical average. Here, the convolutional neural layers CNL1 and CNL2 are trained by variation of their filter parameters $C_i$ and $D_i$, and the neural network NN is trained by variation of its training structure.

Consequently, on the one hand the digital filter DF is trained such that the sequence of filtered signal values GS contains as specifically as possible those features of the sequence of operating parameter values BP that are relevant for a good prediction of the target operating parameter ZBP. On the other hand, the neural network NN is trained in a parallel way to detect functional correlations between the sequence of filtered signal values GS and the target operating parameter ZBP, and consequently to determine a relatively accurate prediction value PZ.

A large number of standard training methods for neural networks, in particular that of monitored learning, may be used for the training of the digital filter DF and the neural network NN. The disparity D to be minimized may in this case be represented by a suitable cost function. A backpropagation method may be used for example for minimizing the disparity.

As a difference from a recurrent neural network, a convolutional neural network can also be efficiently trained for relatively long time series. Moreover, a convolutional neural network is well suited for detecting and extracting correlations of temporally close values occurring in time series. The downstream neural network NN then allows the detected correlations to be classified to a certain extent with regard to the target operating parameter ZBP. By the combination of a convolutional neural network, here DF, and a downstream neural network, here NN, complex correlations in operating parameter time series can also be detected relatively accurately and used for prediction. This also applies in particular to different operating states of the technical system TS.

It is found that, once training of the digital filter DF and the neural network NN has taken place, the prediction value PZ derived from the sequence of operating parameter values BP has a very small prediction error. The prediction value PZ can consequently be used in an advantageous way for forward-looking and precise control of the technical system TS, for monitoring the technical system TS, for early detection of damage, for forecasting the need for resources and/or for other forward-looking control measures. For this purpose, the prediction value PZ is output by the control device CTL. In particular, expedient and optimized control data can be derived by the control device CTL on the basis of the prediction value PZ and transmitted to the technical system TS for controlling it.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a technical system, wherein comprising:
    a) continuously recording a temporal sequence of operating parameter values of the technical system,
    b) continuously converting the sequence of operating parameter values into a sequence of filtered signal values by a trainable digital filter,
    c) feeding the sequence of filtered signal values to a machine learning routine, which derives from the machine learning routine prediction values for a target operating parameter,
    d) training the digital filter and also the machine learning routine to reduce a disparity between derived prediction values and temporally corresponding actually recorded values of the target operating parameter,
    e) outputting the prediction values, and
    f) controlling the technical system based on the outputted prediction values,
    wherein at least one of the machine learning routine and the digital filter comprises an artificial neural network, a recurrent neural network, a convolutional neural network, an autoencoder, a deep learning architecture, a support vector machine, a data-driven trainable regression model, a k-nearest-neighbor classifier, a physical model and/or a decision tree and wherein the digital filter and the machine learning routine are trained in parallel.

2. The method as claimed in claim 1, wherein at least one of the machine learning routine and the digital filter comprises an artificial neural network, a recurrent neural network, a convolutional neural network, an autoencoder, a deep learning architecture, a support vector machine, a data-driven trainable regression model, a k-nearest-neighbor classifier, a physical model and/or a decision tree.

3. The method as claimed claim 1, wherein the conversion by the digital filter is based on filter parameters that are modified by the training of the digital filter in such a way that the disparity is reduced.

4. The method as claimed in claim 1, wherein, in the conversion of the sequence of operating parameter values, moving totals of the operating parameter values that are weighted by filter parameters are formed over a time window.

5. The method as claimed in claim 4, wherein the weighted totals are formed by at least one of a convolution of the sequence of operating parameter values with a sequence of filter parameters and by a moving scalar product of a sequence of operating parameter values with the sequence of filter parameters.

6. The method as claimed in claim 1, wherein the digital filter comprises one or more convolutional neural layers and a pooling layer for filtering the sequence of operating parameter values.

7. The method as claimed in claim 1, wherein a statistical average value of individual disparities respectively between a prediction value and a temporally corresponding actually recorded value of the target operating parameter is used as the disparity.

8. The method as claimed in claim 1, wherein, for recording the sequence of operating parameter values,
    sequences of values of a number of operating parameters are recorded,
    the sequences of values are respectively interpolated to a common, specified time frame, and
    the sequences of values interpolated to the time frame are combined to form the sequence of operating parameter values.

9. The method as claimed in claim 1, wherein, for recording at least one of the sequence of operating parameter values, stored operating parameters recorded earlier and a stored target operating parameter recorded earlier are recorded.

10. A control device for controlling a technical system, comprising a processor configured to execute a method for controlling the technical system, the method comprising:
   a) continuously recording a temporal sequence of operating parameter values of the technical system,
   b) continuously converting the sequence of operating parameter values into a sequence of filtered signal values by a trainable digital filter,
   c) feeding the sequence of filtered signal values to a machine learning routine, which derives from the machine learning routine prediction values for a target operating parameter,
   d) training the digital filter and also the machine learning routine to reduce a disparity between derived prediction values and temporally corresponding actually recorded values of the target operating parameter,
   e) outputting the prediction values, and
   f) controlling the technical system based on the outputted prediction values,
   wherein at least one of the machine learning routine and the digital filter comprises an artificial neural network, a recurrent neural network, a convolutional neural network, an autoencoder, a deep learning architecture, a support vector machine, a data-driven trainable regression model, a k-nearest-neighbor classifier, a physical model and/or a decision tree and wherein the digital filter and the machine learning routine are trained in parallel.

11. A computer program product, comprising a computer readable hardware storage device having computer readable program code stored therein, said program code executable by a processor of a computer system to implement a method designed for executing a method for controlling a technical system, the method comprising:
   a) continuously recording a temporal sequence of operating parameter values of the technical system,
   b) continuously converting the sequence of operating parameter values into a sequence of filtered signal values by a trainable digital filter,
   c) feeding the sequence of filtered signal values to a machine learning routine, which derives from the machine learning routine prediction values for a target operating parameter,
   d) training the digital filter and also the machine learning routine to reduce a disparity between derived prediction values and temporally corresponding actually recorded values of the target operating parameter,
   e) outputting the prediction values, and
   f) controlling the technical system based on the outputted prediction values,
   wherein at least one of the machine learning routine and the digital filter comprises an artificial neural network, a recurrent neural network, a convolutional neural network, an autoencoder, a deep learning architecture, a support vector machine, a data-driven trainable regression model, a k-nearest-neighbor classifier, a physical model and/or a decision tree and wherein the digital filter and the machine learning routine are trained in parallel.

12. A computer-readable storage medium with the computer program product as claimed in claim 11.

* * * * *